United States Patent Office 3,426,918
Patented Feb. 11, 1969

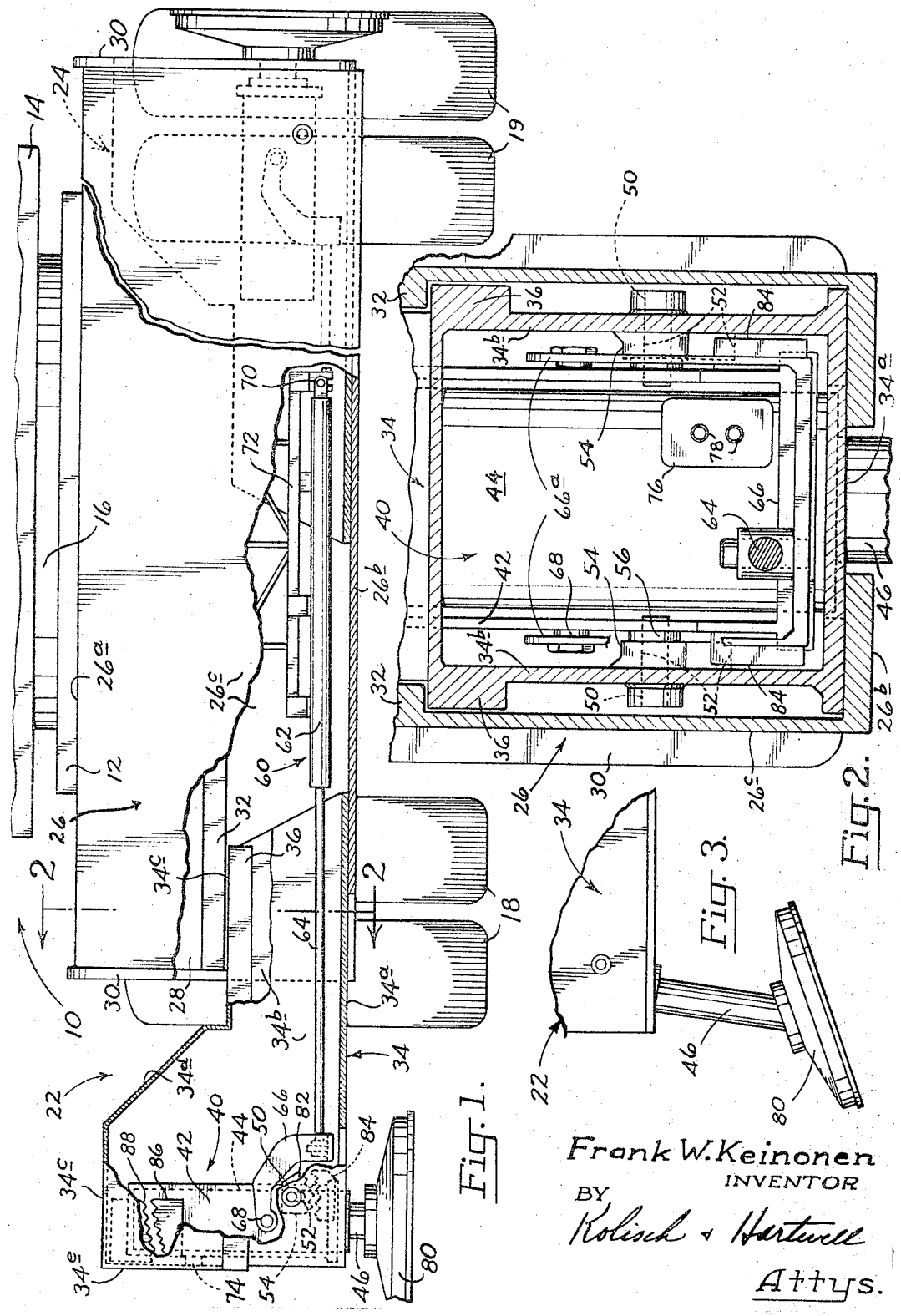

1

3,426,918
STABILIZING OUTRIGGER APPARATUS
FOR MOBILE VEHICLE
Frank W. Keinonen, Hillsboro, Oreg., assignor to Pierce-Pacific Manufacturing, Inc., Portland, Oreg., a corporation of Oregon
Filed May 19, 1967, Ser. No. 639,681
U.S. Cl. 212—145                                   6 Claims
Int. Cl. B66c 23/80

ABSTRACT OF THE DISCLOSURE

Stabilizing outrigger apparatus for a mobile vehicle, including an extensible section slidable outwardly on an encompassing guide section, where the extensible section has an hydraulically operated jack journaled on its outer end, and the jack, by reason of an offset connection with a ram producing extension of the extensible section, swings to an upright position on such extension, the mounting for the jack further accommodating limited upward shifting of the jack with subsequent fixing of the jack in an upright position occurring by reason of cooperating jaws coming into engagement.

---

This invention relates to outrigger apparatus such as may be used to provide lateral support and thus to stabilize a vehicle. Outrigger apparatus is frequently employed with vehicles such as mobile cranes, shovels and like equipment, to support the sides of the vehicle and prevent excessive loading of its suspension system. By indicating specific types of vehicles for illustrative purposes, however, it is not intended to be limited to any specific vehicle uses.

A general object of the invention is to provide outrigger apparatus of the type described, which includes an outwardly extensible section, an extensible jack with ground-engaging pad journaled on this extensible section for movement between horizontal and upright positions, and novel mechanism whereby power-operated extensible means produces both extension of the extensible section and swinging movement of the extensible jack. With the organization described, it is possible to have a considerable reach laterally outwardly and downwardly of the ground-engaging pad, which results in good stability in the vehicle. Further, the movements desired in the extensible section and jack are obtained with a compact and efficiently operating mechanism.

Another object and feature of the invention is the provision of a construction which is particularly well adapted to include an hydraulically operated jack, as the jack which extends to lower a ground-engaging pad. Thus, the construction is one where the jack, on moving from a position on its side to an upright position, primarily swings about a journal axis, without displacement of the jack longitudinaly of the extensible section which mounts it.

Another object of the invention is the provision of a construction which operates, on extension of the jack carrying the ground-engaging pad, to produce a mechanical lock holding the jack in place, thus to promote stability in the outrigger mechanism.

Vehicles of the type described are frequently operated in locations where the terrain under and adjacent the vehicle is not flat. In the usual instance, as when working on a road bed, the ground outwardly from the vehicle slopes downwardly from the ground level under the vehicle. With such conditions, and on extension of a jack carrying a ground-engaging pad, upon the pad coming into contact with the ground, forces result tending to skew the jack in its mounting, which can produce high stressing of the parts. This invention has, as a still further specific object, the provision of a novel mounting for the jack which permits the jack to shift angularly in its mounting prior to becoming fixed in position as described, this shifting operating to inhibit stressing in the parts when the jack is fully extended.

The construction contemplated is relatively simple and requires relatively few operating parts. With the construction, two outrigger mechanisms may be provided for an end of a vehicle, with extensible sections in the outrigger mechanisms aligned in a transverse direction.

These and other objects and advantages are attained by the invention, and the same is described hereinbelow in conjunction with the accompanying drawings, wherein:

FIG. 1 is a rear-end, elevational view, of portions of a vehicle equipped with a pair of opposed outrigger mechanisms as contemplated herein, and with portions broken away to illustrate details of internal construction;

FIG. 2 is a cross-sectional view, on a somewhat enlarged scale, taken generally along the line 2—2 in FIG. 1; and FIG. 3 illustrates how a jack in an outrigger mechanism may extend and incline prior to becoming locked in position.

Referring now to the drawings, illustrated in somewhat simplified form are portions of the rear end of an industrial vehicle 10 of the type commonly provided with outrigger apparatus to produce lateral stability when operating the vehicle. The vehicle includes the usual frame, parts of which are shown at 12, and cab partially shown at 14 supported on the frame through a turntable 16 accommodating swiveling of the cab and related structure relative to frame 12 about an upright axis. Shown supporting the vehicle for movement over the ground are rear wheels 18, 19.

Suitably mounted on the rear of frame 12 are a pair of outrigger mechanisms 22, 24 which are extensible outwardly from opposite sides of the vehicle to be placed in an operative, vehicle-stabilizing position. While the outrigger mechanisms are shown at the rear of the vehicle, it should be understood, of course, that they may as well be put adjacent the front, or between the vehicle's ends, or at other locations, with their purpose being the same.

Considering now more in detail the construction of an outrigger mechanism and its mounting, at 26 is indicated an elongated, hollow, box-like structure of substantially rectangular cross section which extends transversely of the vehicle and is referred to herein as a tunnel or guide section. The guide section includes a top 26a, bottom 26b and sides 26c, and is open at opposite ends as demonstrated by opening 28. Rimming the top and sides of the tunnel section, at each end, is a U-shaped collar piece 30. Elongated bars or rails 32 extend along the length of the tunnel section inside it, and are secured to its opposite sides. These bars, bottom 26b and lower parts of the tunnel section sides, define an elongated channel along the base of the tunnel section slidably receiving inner extremities of outrigger mechanisms 22, 24, while guiding the outrigger mechanisms for movement in a horizontal, transversely extending direction.

The two outrigger mechanisms are similar in construction. Considering outrigger mechanisms 22, shown at 34 is a slide or extensible section in the outrigger mechanism, including a base 34a and opposed upstanding sides 34b. Over an inner region of the slide section the section is bounded by a top 34c. The slide section enlarges to form a housing for an extensible jack to be described, and thus in its outer region includes a sloping top section 34d and a ceiling section 34c. Disposed on the outside of and secured to sides 34b are opposed rails or bars 36. Base 34a slidably rests on the top of bottom 26b of the tunnel section, and the tops of bars 36 slide under the under-surfaces of bars 32 in the tunnel section, and in this way the slide section is slidably supported for extensible movement relative to the tunnel section. Partially closing off the left end of the slide section in FIG. 1 is an end wall 34e.

In FIG. 1 the slide or extensible section of outrigger mechanism 22 is shown fully extended and in its operative position when stabilizing the vehicle. The extensible or slide section of outrigger mechanism 24 is shown retracted, and in the position it occupies when the outrigger mechanism is not in use.

Disposed adjacent the outer extremity of slide section 34 is a jack assembly indicated generally at 40, including a hollow supporting frame 42 and located within this frame an hydraulically operated extensible jack including jack cylinder 44 and rod 46. Jack cylinder 44 is mounted securely in place within frame 42 and rod 46 protrudes downwardly from the base of the frame and moves downwardly to a fully extended position on extension of the jack.

The mounting for jack assembly 40 in extensible section 34 comprises a pair of opposed journal pins 50 suitably mounted in a fixed position in side walls 34b of the extensible section. Inner extremities of these pins project into slots 52 provided in opposite sides of jack assembly frames 42. Plate pieces 54 are joined to the inner sides of opposed slide section side walls 34b (the journal pins extending through these pieces), and mounted on the journal pins between the plate pieces and the opposed sides of jack assembly frame 42 are washers, such as washer 56. The mounting just described thus includes a journal connection in the form of the journal pins permitting swinging of the jack assembly, including frame 42, from a position where the assembly is on its side (as indicated by the dashed outline of the jack assembly for outrigger mechanism 24) to an upright position (shown for the jack assembly in outrigger mechanism 22). Since slots 52 have a length approximating twice the diameter of the journal pins, the mounting also accommodates limited up and down movement of the jack assembly relative to the extensible or slide section.

Associated with each outrigger mechanism, and located within the slide and tunnel sections, and substantially paralleling the path that the slide section takes on extending from the tunnel section, is an elongated power-operated extensible means, more specifically fluid-operated ram 60, including a ram cylinder 62 and rod 64. Mounted on the extreme end of rod 64 is a clevis 66 with legs straddling frame 42 of the jack assembly. Journal connections 68 join the outer ends of the clevis legs 66a to jack assembly frame 42 on opposite sides of this frame. Ram cylinder 62 is pivotally anchored at 70 on supporting framework 72 located within the tunnel section.

With the extensible section retracted, as shown for outrigger mechanism 24, as already indicated, the jack assembly is disposed on its side and overlies clevis 66 with the clevis legs straddling the bottom of the assembly. Journal connection 68 connecting the clevis to the jack assembly frame is located above journal pin 50. Upon extension of ram 60, and because friction inhibits sliding of the extensible section in the outrigger mechanism, whereas there is essentially no resistance to pivotal movement of the jack assembly, the first action that occurs is that the jack assembly is swung from its position on its side to an upright position. On reaching an upright position (determined by the jack frame striking an abutment 74 secured to end wall 34e), further swinging movement of the assembly is prevented, and on further extension of ram 60 the extensible section is moved out of guide tunnel 26.

The jack in jack assembly 40 is extended and retracted by admitting fluid under pressure thereto and exhausting fluid from the jack through a valve assembly 76. Hoses, portions of which are shown at 78, connect with this valve assembly. The valve assembly and the hose connection is located adjacent journal pins 50. As a consequence, on swinging of the jack assembly from a horizontal to an upright position, there is relatively little movement of the valve assembly with respect to the guide section. This reduces to a minimum the amount of hose length required in the extensible section to accommodate this movement.

Rod 46 of the jack assembly has a pad 80 mounted on its lower end. The mounting is such as to accommodate limited relative swiveling movement of the pad, as can be seen by comparing FIGS. 1 and 3. This enables the pad to shift on coming into contact with the ground, whereby its base lies generally in the plane of the ground which the pad contacts.

Plate pieces 54 have been earlier described secured to the inner surfaces of tunnel sides 34b. These pieces have teeth 82 defined along their lower margins and function as a pair of jaw parts in the construction. Secured to the sides of frame 42 are cooperating jaw parts 84, with teeth along their upper margins which engage with the teeth of pieces 54 upon upward shifting of the jack assembly and frame 42. At the top of the jack assembly, and secured to frame 42, are another set of jaw parts 86 with teeth along their upper margins, and these jaw parts come into engagement with jaw parts 88 mounted on the slide section directly above jaw parts 86.

On the extensible section being extended, and on subsequent extension of jack assembly 40, rod 46 lowers until pad 80 comes into ground contact. If the ground is substantially level under the pad 80, on contacting the ground a reaction force is exerted upwardly on the jack assembly causing frame 42 to rise, with the base of slots 52 coming up against pins 50. With rising of the jack assembly, the several jaw parts mentioned intermesh or engage, which locks or holds the jack assembly from swinging about journal pins 50. In this way a completely rigid support, providing maximum stability, results. Further, with the jaw parts engaging, stressing of the journal pins is minimized as, in effect, the load is supported by the extensible section through the jaw parts and jack assembly frame 42. Should the ground slope away from the vehicle, as illustrated in FIG. 3, there will be a tendency for rod 46 to move down hill as illustrated, resulting in some angular movement of the jack assembly frame. This angular movement is permitted (and such may be accompanied with slight contraction of ram 60) by the jack assembly frame swinging on journal pins 50. On sufficient reaction forces being set up, the jack assembly frame moves upwardly with the jaw parts engaging, but with the jaw parts on the jack assembly shifted somewhat relative to jaw parts on the extensible section.

It will be noted in FIG. 2 that rod 64 of the ram which produces extension of the extensible section is offset somewhat to the left of the middle of jack assembly 40. This leaves room for mounting a similar ram within the tunel producing extension of outrigger mechanism 24, which other ram is offset in the opposite direction. The same tunnel is used to house the extensible sections in both outrigger mechanisms, with such sections aligned in a transverse direction.

The operation of the apparatus should be apparent from the above description. With extension of the rams indicated, the jack assemblies in the outrigger mechanisms swing from a horizontal to an upright position and this is followed with extension of the extensible sections. With the rams fully extended, the hydraulic jacks may be actuated to lower the ground contacting pads 80. With the pads coming into ground contact, reaction forces are set up, shifting the assemblies upwardly to produce locking them in place on the extensible sections. To retract the outrigger mechanisms, the jacks are first retracted which, with lifting of the pads off the ground, results in the assemblies dropping with disengagement of the cooperating jaw parts. On contraction of the rams the jack assemblies are first swung to their horizontal positions, and this is followed with inward movement of the extensible sections.

The apparatus is compact, with both outrigger mechanisms being aligned. Considering each outrigger mechanism, one ram produces both extension and vertical swinging of the jack assembly. The jack assemblies, featuring hydraulically operated jacks, may be remotely controlled.

It is claimed and desired to secure by Letters Patent:

1. In a mobile vehicle including a frame, stabilizing outrigger apparatus for the frame comprising a guide section mounted on the frame; an extensible section mounted in a retracted position on the guide section and movable along a substantially horiozntal path to an extended position located outwardly on the guide section; an extensible jack assembly disposed on its side on the extensible section; a mounting including a journal connection journaling said jack assembly on said extensible section adjacent the latter's outer end permitting swinging movement of the jack assembly to an upright position, said mounting including means accommodating limited upward shifting of the jack assembly relative to the extensible section with the jack assembly in its upright position which upward shifting is in addition to any movement resulting from swinging of the jack assembly; power-operated extensible means connected adjacent an end thereof to the jack assembly operable on extension to move said extensible section from its retracted to its extended position and then to swing the jack assembly to an upright position; and holding means operable to fix the jack assembly from swinging about said journal connection relative to the extensible section made operable upon upward shifting of the jack assembly relative to the extensible section.

2. The outrigger apparatus of claim 1, wherein said holding means comprises a first jaw part mounted on said extensible section and a second jaw part mounted on said movable jack assembly, which jaw parts are moved into engagement on upward shifting of the jack assembly.

3. The apparatus of claim 1, wherein said holding means comprises a pair of jaw parts secured to said jack assembly disposed above and below said journal connection with the jack assembly upright, and a second pair of jaw parts secured to said extensible section disposed above and below said journal connection with the jack assembly upright, said first and second pair of jaw parts moving into cooperative engagement upon upward shifting of the jack assembly.

4. In a mobile vehicle including a frame, stabilizing outrigger apparatus for the frame comprising an extensible section disposed in a retracted position with respect to the vehicle frame and movable outwardly from the frame to an extended position with respect to the frame, an extensible jack assembly disposed on its side on the extensible section, a mounting including a journal connection journaling the jack assembly on the extensible section adjacent the latter's outer end and permitting swinging movement of the jack assembly to an upright position, said mounting further including means accommodating limited upward shifting of the jack assembly relative to the extensible section with the jack assembly in its upright position which upward shifting is in addition to any movement resulting from swinging of the jack assembly, power-operated means operatively connected to the jack assembly and extensible section for shifting the extensible section to its extended position and then swinging the jack assembly to its upright position, and holding means operable to fix the jack assembly from swinging about said journal connection relative to the extensible section after such upward shifting of the jack assembly.

5. The outrigger apparatus of claim 4, wherein said jack assembly comprises a pressure-fluid operated jack including a cylinder and extensible rod, the rod extends downwardly from the bottom end of the cylinder with the jack assembly upright, said journal connection is adjacent said bottom end of the cylinder, and fluid supply means is provided for the fluid-operated jack in the assembly connecting with the jack's cylinder adjacent the cylinder's said bottom end.

6. The apparatus of claim 4, wherein said holding means comprises multiple jaw parts secured to the jack assembly at points disposed vertically therealong with the jack assembly upright, and multiple jaw parts secured to the extensible section in a position to be engaged by the first-mentioned multiple jaw parts on upward shifting of the jack assembly.

References Cited

UNITED STATES PATENTS

| 2,777,586 | 1/1957 | Boysen | 212—145 |
| 3,007,717 | 11/1961 | Noly | 212—145 |
| 3,062,385 | 11/1962 | Thompson | 212—145 |
| 3,164,261 | 1/1965 | Larson | 212—145 |

EVON C. BLUNK, *Primary Examiner.*

H. C. HORNSBY, *Assistant Examiner.*